US012621553B2

(12) United States Patent
Lee et al.

(10) Patent No.: US 12,621,553 B2
(45) Date of Patent: May 5, 2026

(54) CAMERA MODULE

(71) Applicant: LG INNOTEK CO., LTD., Seoul (KR)

(72) Inventors: Min Woo Lee, Seoul (KR); Sun Min Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 126 days.

(21) Appl. No.: 18/686,110

(22) PCT Filed: Aug. 18, 2022

(86) PCT No.: PCT/KR2022/012351
§ 371 (c)(1),
(2) Date: Feb. 23, 2024

(87) PCT Pub. No.: WO2023/027424
PCT Pub. Date: Mar. 2, 2023

(65) Prior Publication Data
US 2024/0380963 A1     Nov. 14, 2024

(30) Foreign Application Priority Data
Aug. 23, 2021     (KR) ........................ 10-2021-0111122

(51) Int. Cl.
H04N 23/55          (2023.01)
G02B 7/00           (2021.01)
(Continued)

(52) U.S. Cl.
CPC ............ H04N 23/55 (2023.01); G02B 7/003 (2013.01); G03B 30/00 (2021.01); H04N 23/51 (2023.01)

(58) Field of Classification Search
CPC ........ H04N 23/55; H04N 23/51; H04N 23/52; H04N 23/54; H04N 23/57; H04N 23/40;
(Continued)

(56) References Cited

U.S. PATENT DOCUMENTS

| | | | | |
|---|---|---|---|---|
| 11,671,686 B1 * | 6/2023 | Maghirang | ............ | H04N 23/57 |
| | | | | 348/208.11 |
| 2016/0205294 A1 * | 7/2016 | Ahn | ........................ | H04N 23/55 |
| | | | | 348/373 |

(Continued)

FOREIGN PATENT DOCUMENTS

| | | | | |
|---|---|---|---|---|
| CN | 112073604 A | * 12/2020 | ............ | H04N 23/50 |
| EP | 3 392 689 A1 | 10/2018 | | |

(Continued)

OTHER PUBLICATIONS

Supplementary European Search Report dated Nov. 28, 2024 in European Application No. 22861634.8.

(Continued)

*Primary Examiner* — Abdelaaziz Tissire
(74) *Attorney, Agent, or Firm* — Saliwanchik, Lloyd & Eisenschenk

(57) ABSTRACT
A camera module comprises: a first body including a lens; a second body coupled to the first body; a shield member coupled to the second body; a substrate disposed within the shield member; and a fastening member coupling the substrate and the shield member to the second body, wherein the shield member includes a bottom plate and a first coupling part protruding from the bottom plate to support the substrate.

19 Claims, 14 Drawing Sheets

(51) Int. Cl.
  *G03B 30/00*           (2021.01)
  *H04N 23/51*          (2023.01)

(58) Field of Classification Search
  CPC .......... H04N 23/50; G02B 7/003; G02B 7/02;
                    G03B 30/00; G03B 3/10; G03B 35/06;
                    G03B 17/02; G03B 2217/002; G03B
                    17/12; H05K 1/147; H05K 2201/10121;
                    H05K 2201/10151; H05K 2201/10371;
                    H05K 9/0033; H05K 9/0024
  See application file for complete search history.

(56)                    References Cited

U.S. PATENT DOCUMENTS

| | | | |
|---|---|---|---|
| 2018/0255213 A1* | 9/2018 | Ahn | B60R 11/04 |
| 2019/0041600 A1* | 2/2019 | Sakamoto | G03B 17/02 |
| 2019/0121050 A1* | 4/2019 | Park | G02B 7/02 |
| 2019/0227411 A1* | 7/2019 | Park | H04N 23/52 |
| 2020/0053258 A1* | 2/2020 | Park | H04N 23/52 |
| 2020/0145560 A1 | 5/2020 | Han | |

FOREIGN PATENT DOCUMENTS

| | | |
|---|---|---|
| EP | 3 531 681 A1 | 8/2019 |
| JP | 2019-47435 A | 3/2019 |
| JP | 2021-39952 A | 3/2021 |
| KR | 10-2018-0042566 A | 4/2018 |
| KR | 10-2018-0060522 A | 6/2018 |
| KR | 10-2020-0058038 A | 5/2020 |
| KR | 10-2021-0022887 A | 3/2021 |

OTHER PUBLICATIONS

International Search Report dated Dec. 1, 2022 in International Application No. PCT/KR2022/012351.

\* cited by examiner

FIG. 6

CAMERA MODULE

CROSS-REFERENCE TO RELATED APPLICATIONS

This application is the U.S. national stage application of International Patent Application No. PCT/KR2022/012351, filed Aug. 18, 2022, which claims the benefit under 35 U.S.C. § 119 of Korean Application No. 10-2021-0111122, filed Aug. 23, 2021, the disclosures of each of which are incorporated herein by reference in their entirety.

TECHNICAL FIELD

The teachings in accordance with exemplary and non-limiting embodiments of this invention relate generally to a camera module.

BACKGROUND ART

In recent years, subminiature camera modules have been developed, and subminiature camera modules are widely used in small electronic products such as smartphones, laptops, game consoles, etc. With the popularity of automobiles, subminiature cameras are not only used in small electronic products, but also in vehicles. For example, subminiature cameras are used as black box cameras for vehicle protection or objective data of traffic accidents, rear view cameras that allow the driver to monitor the blind spots at the rear of the vehicle through the screen to ensure safety when reversing, and perimeter detection cameras that can monitor the surroundings of the vehicle.

The camera may include a lens, a lens holder for receiving the lens, an image sensor for converting an image of a subject gathered by the lens into an electrical signal, and a printed circuit board on which the image sensor is mounted. The housing forming the exterior of the camera may have an enclosed structure throughout to inhibit contamination of the internal components with foreign matter, including moisture.

DETAILED DESCRIPTION OF INVENTION

Technical Subject

It is an object of the present exemplary embodiment to provide a camera module in which the distance between the lens and the image sensor can be easily aligned and the printed circuit board can be firmly fixed within the body.

Furthermore, it is possible to provide a structure for alignment regardless of whether the lens is aligned with the image sensor or the image sensor is aligned with the lens.

Technical Solution

In one general aspect of the present invention, there may be provided a camera module comprising:

a first body including a lens;

a second body coupled to the first body;

a shield member coupled to the second body;

a substrate disposed within the shield member; and a fastening member coupling the substrate and the shield member to the second body, wherein the shield member includes a bottom plate and a first coupling part protruding from the bottom plate to support the substrate.

Preferably, but not necessarily, the first body may be coupled to the second body by an adhesive.

Preferably, but not necessarily, the first coupling part of the shield member may include a fourth hole into which the fastening member is inserted.

Preferably, but not necessarily, the substrate may include a second hole formed in a position corresponding to the fourth hole in the shield member, and the fastening member may be inserted into the second hole.

Preferably, but not necessarily, the fastening member may include a screw, and the second body may include a first hole into which the screw is threaded.

Preferably, but not necessarily, the fastening member may be integrally formed with the second body.

Preferably, but not necessarily, the second body may include a second coupling part corresponding to a shape of the first coupling part of the shield member.

Preferably, but not necessarily, the fastening member may be formed extending from one end of the second coupling part of the second body.

Preferably, but not necessarily, the first body may be spaced apart from the substrate.

In another general aspect of the present invention, there may be provided a camera module comprising: a lens part;

an image sensor coupled to the lens part; and a connector in electrical communication with the image sensor, wherein the image sensor includes a back cover, a shield member coupled to the back cover, and a substrate disposed within the shield member and having the image sensor disposed on an upper surface, the shield member including a guide extending from a bottom surface to support the connector.

Preferably, but not necessarily, the lens part may include a front cover, and the front cover may be coupled to the rear cover by an adhesive.

Preferably, but not necessarily, the front cover may include a first sidewall having a first groove formed at an end, and the rear cover may include a second sidewall having a second protrusion formed at a corresponding position of the first groove of the front cover at an end.

Preferably, but not necessarily, the adhesive may be disposed between the first groove of the front cover and the second protrusion of the rear cover.

Preferably, but not necessarily, the guide may include a first region extending from the bottom surface and a second region bending at one end of the first region.

In still another general aspect of the present invention, there may be provided a camera module comprising:

a lens part including a lens and a first body;

an image sensor part including a substrate coupled to the lens part, on which an image sensor is disposed, and a second body to which the substrate is coupled; and an adhesive for bonding the first body and the second body, wherein, upon coupling the first body and the second body, the optical axis of the lens and the position of the image sensor are aligned.

Advantageous Effect

The exemplary embodiments of the present embodiment have the advantageous effects in that the substrate is fixed in the second body, so that coupling between the plurality of bodies and optical axis alignment and distance adjustment between the image sensor and the lens can be performed simultaneously, thereby improving production efficiency by reducing assembly labor.

In addition, since the substrate can be firmly fixed within the body, it is advantageous to inhibit damage to the components of the camera module from external impact.

BRIEF DESCRIPTION OF DRAWINGS

Figure 6:
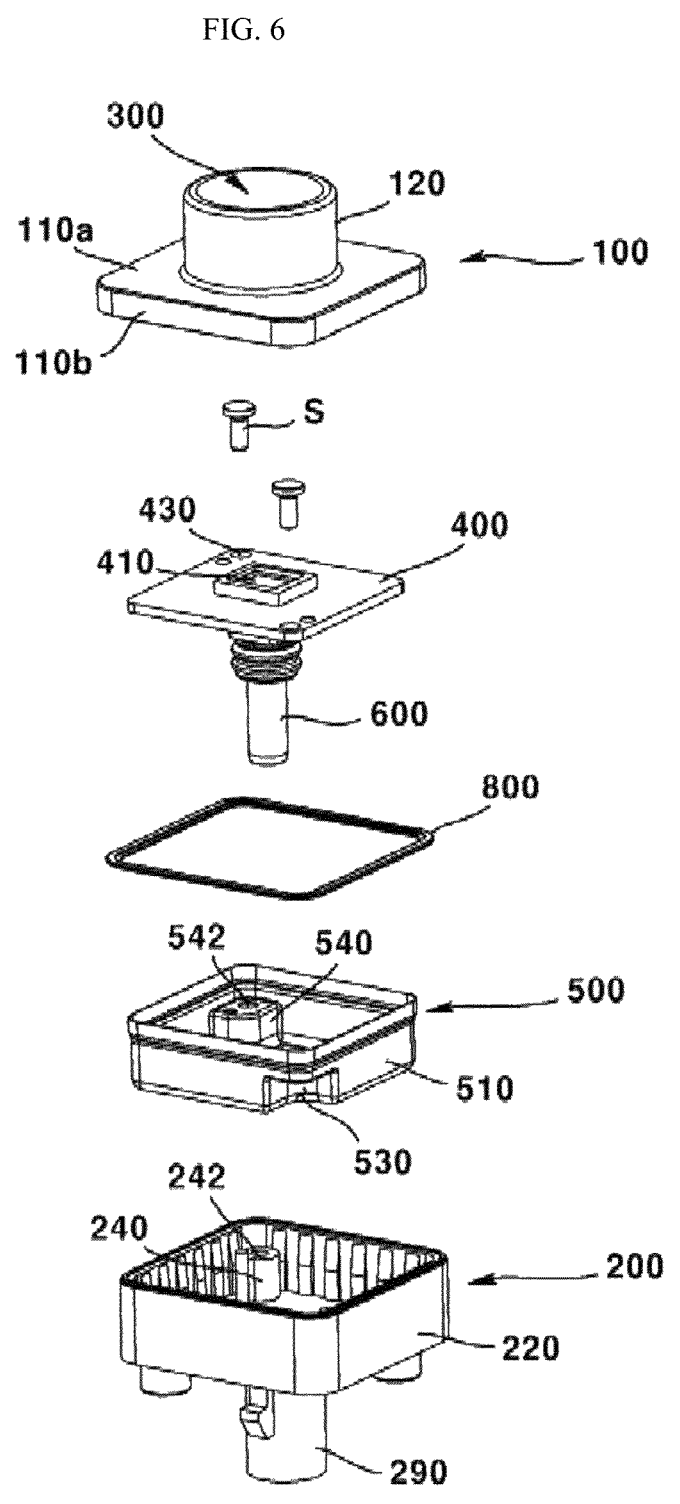

FIG. 6 is a drawing showing FIG. 5 from a different angle.

BEST MODE

Hereinafter, exemplary embodiments of the present invention will be described in detail with reference to the accompanying drawings.

However, the present invention is not limited to the given exemplary embodiments described, but may be implemented in a variety of different forms, and one or more of components among the exemplary embodiments may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

As used herein, "optical axis direction" is defined as the optical axis direction of the lens. On the other hand, "optical axis direction" may correspond to "up and down direction", "z-axis direction", etc.

Hereinafter, the present invention will be described in more detail with reference to the accompanying drawings.

Figure 1:
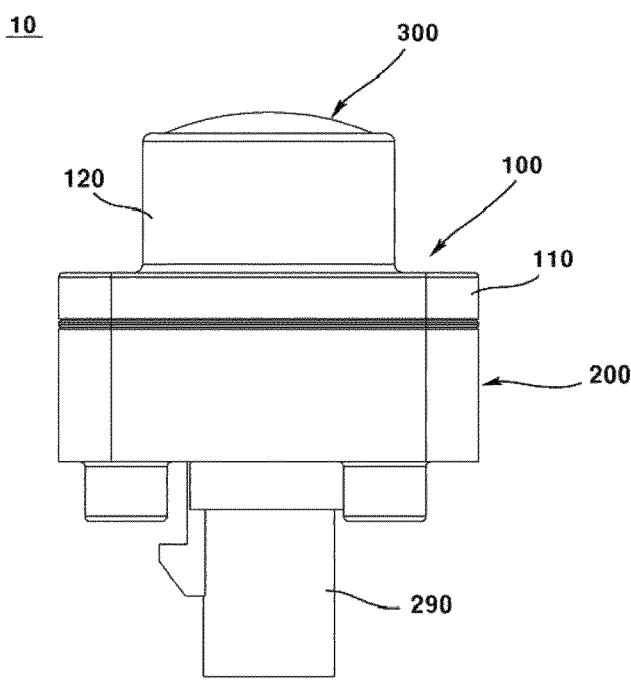
FIG. 1 is a perspective view illustrating the exterior of a camera module according to an exemplary embodiment of the present invention.
Figure 2:
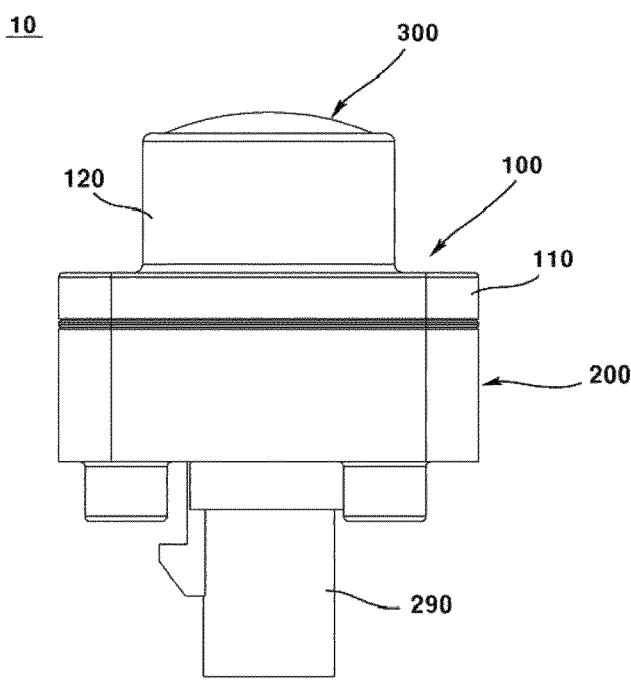
FIG. 2 is a top view illustrating a side view of a camera module according to an exemplary embodiment of the present invention.
Figure 3:
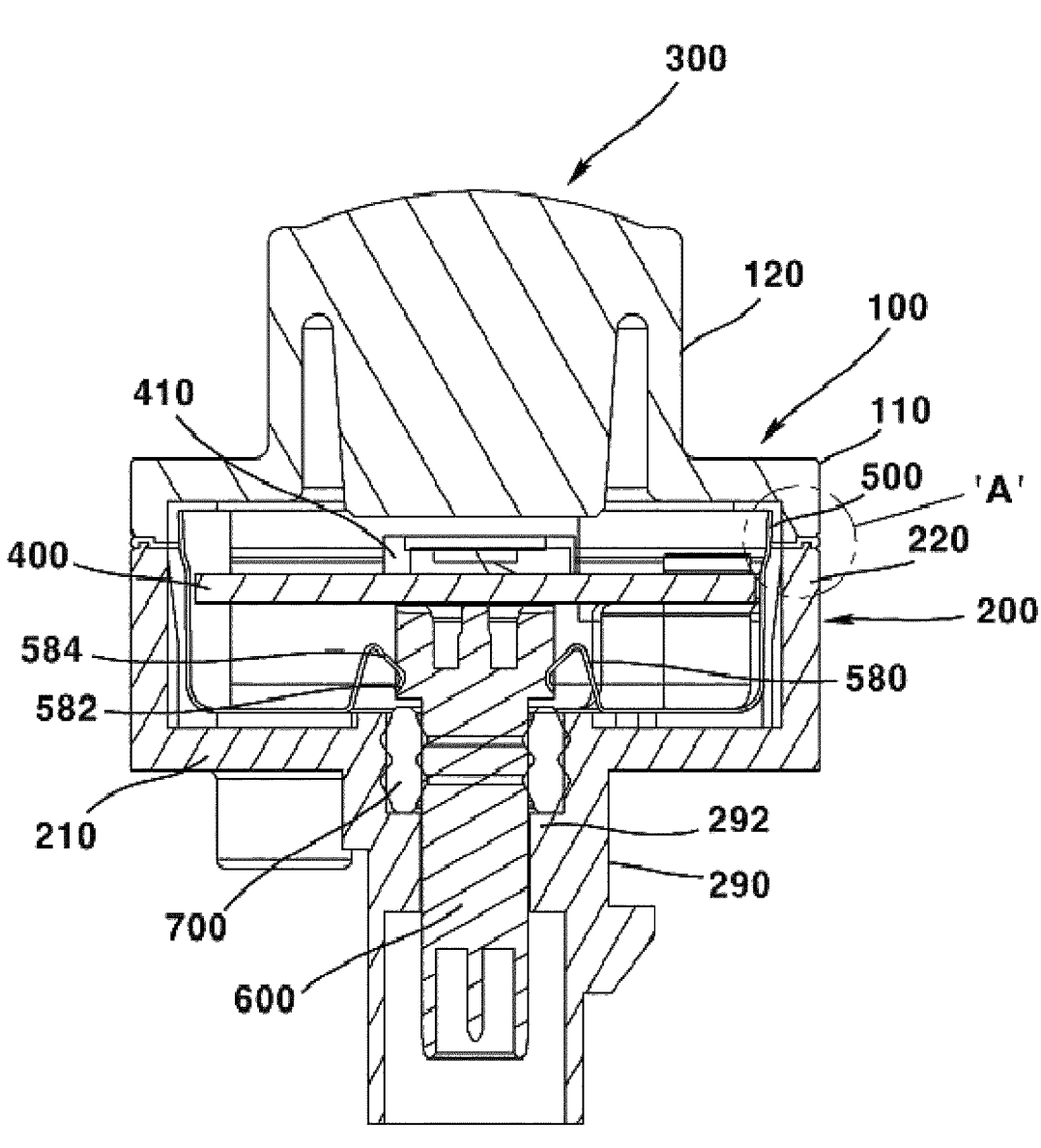
FIG. 3 is a cross-sectional view of a camera module according to an exemplary embodiment of the present invention.
Figure 4:
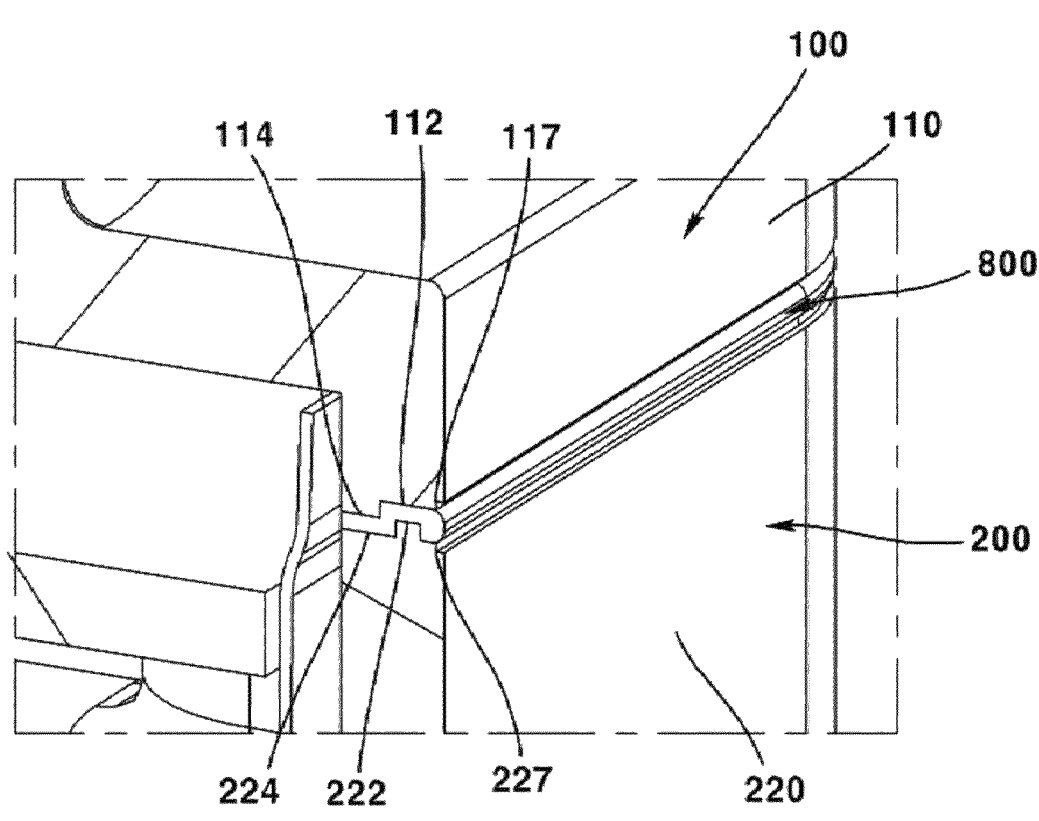
FIG. 4 is an enlarged perspective view of A in FIG. 3.
Figure 5:
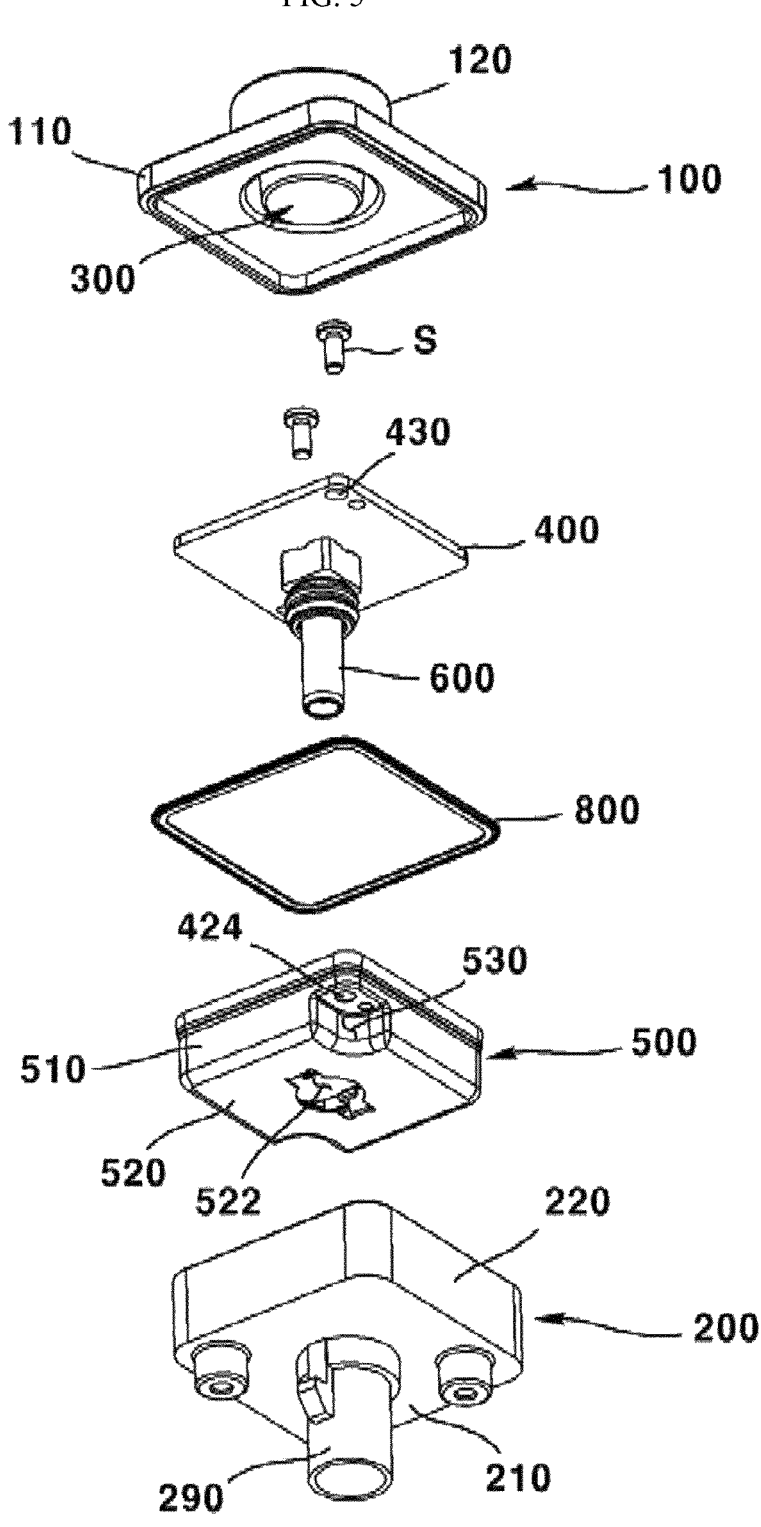
FIG. 5 is an exploded perspective view of a camera module according to an exemplary embodiment of the present invention.
Figure 7:
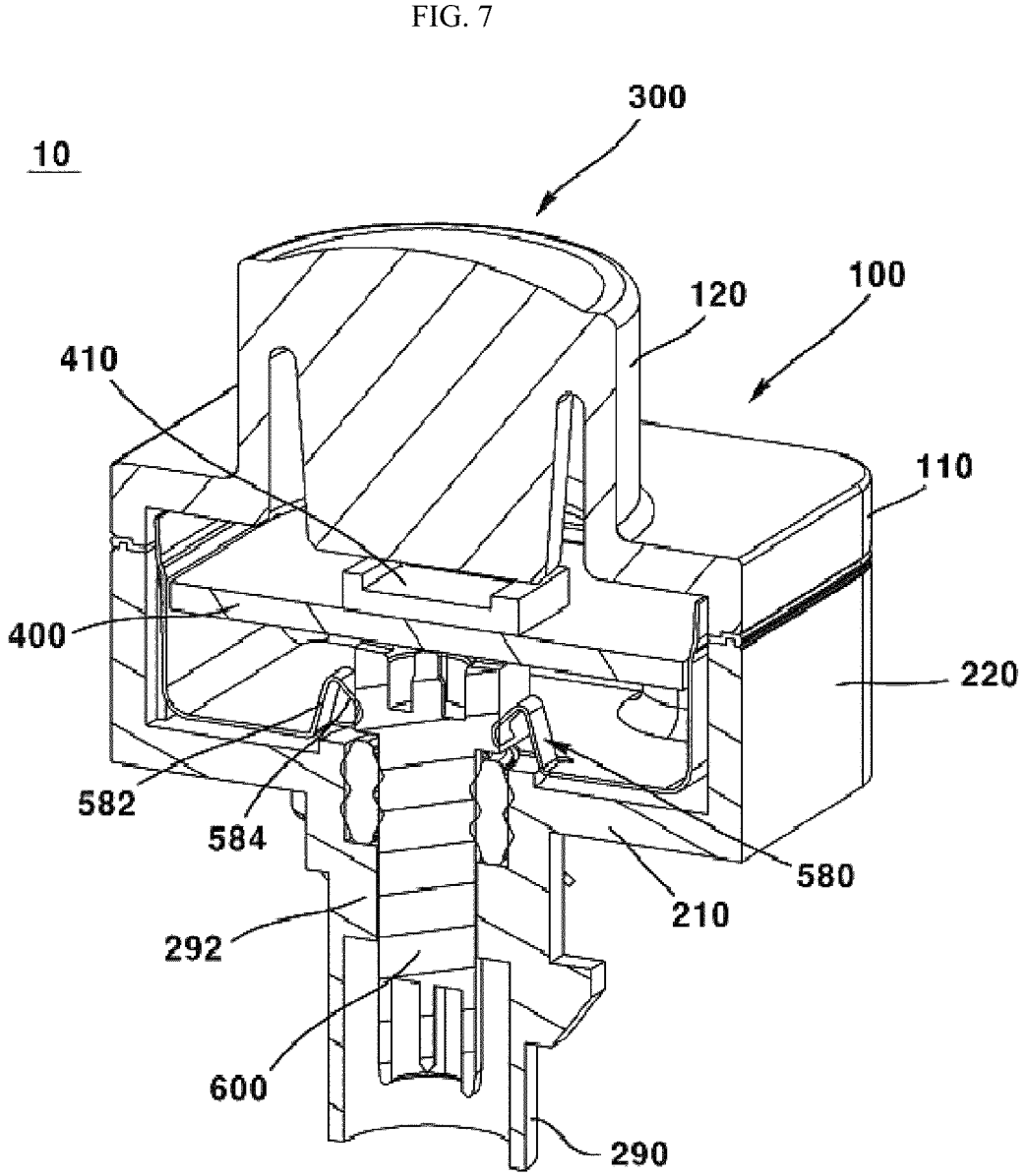
FIG. 7 is a perspective view of an incised portion of a camera module according to an exemplary embodiment of the present invention.
Figure 8:
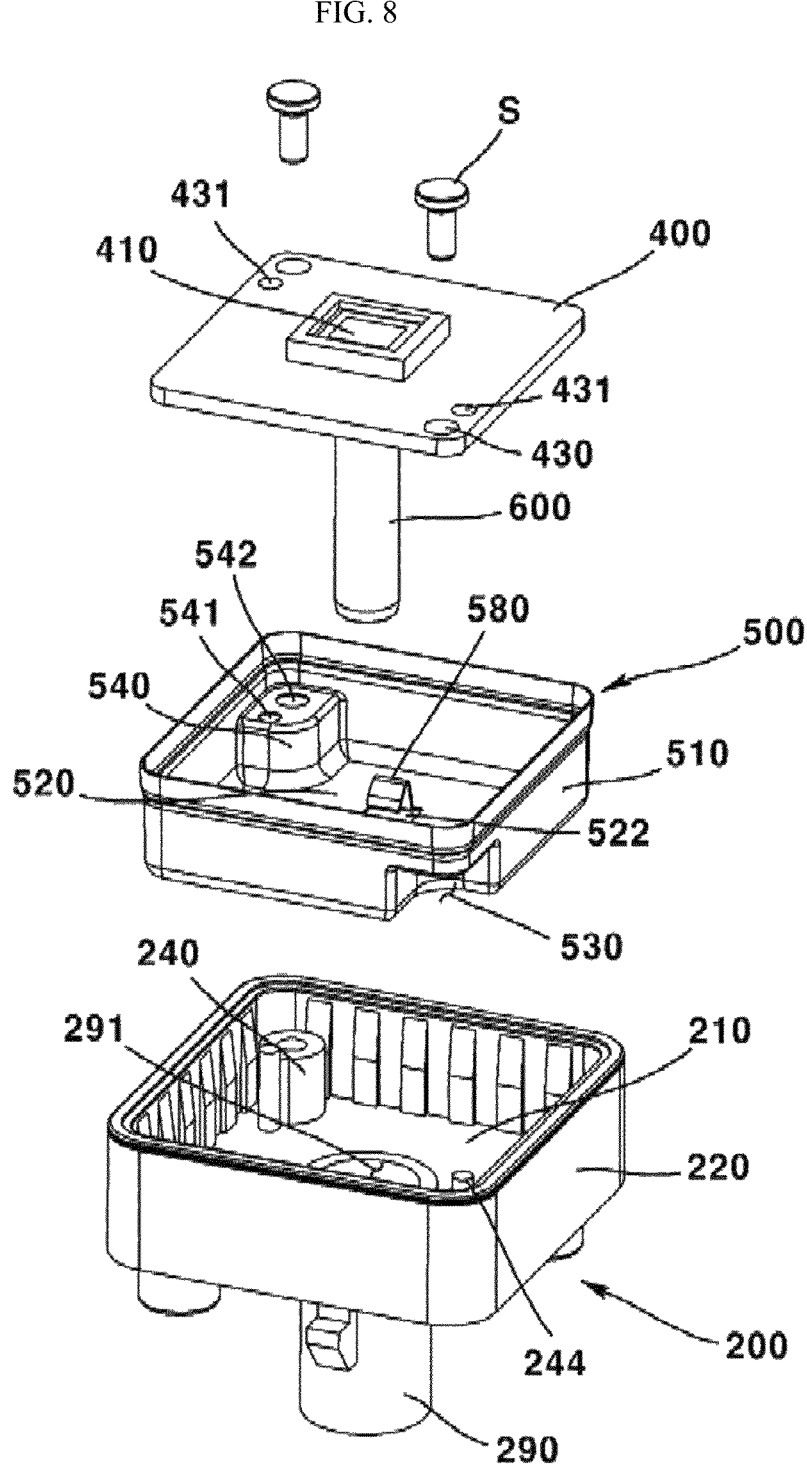
FIG. 8 is an exploded perspective view of a printed circuit board, shield member, and second body according to an exemplary embodiment of the present invention.
Figure 9:
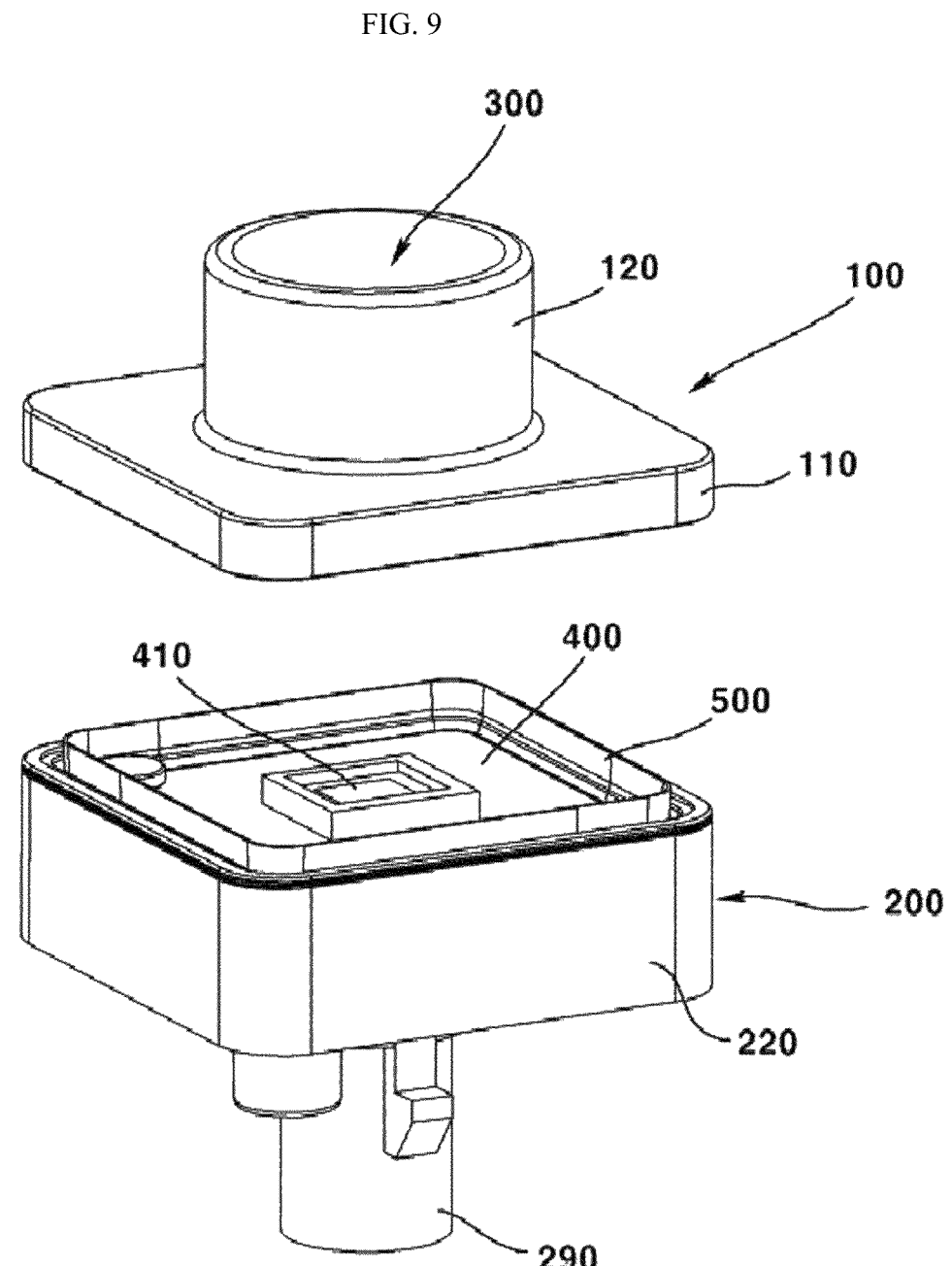
FIG. 9 is an exploded perspective view of a first body and a second body, according to an exemplary embodiment of the present invention.
Figure 10:
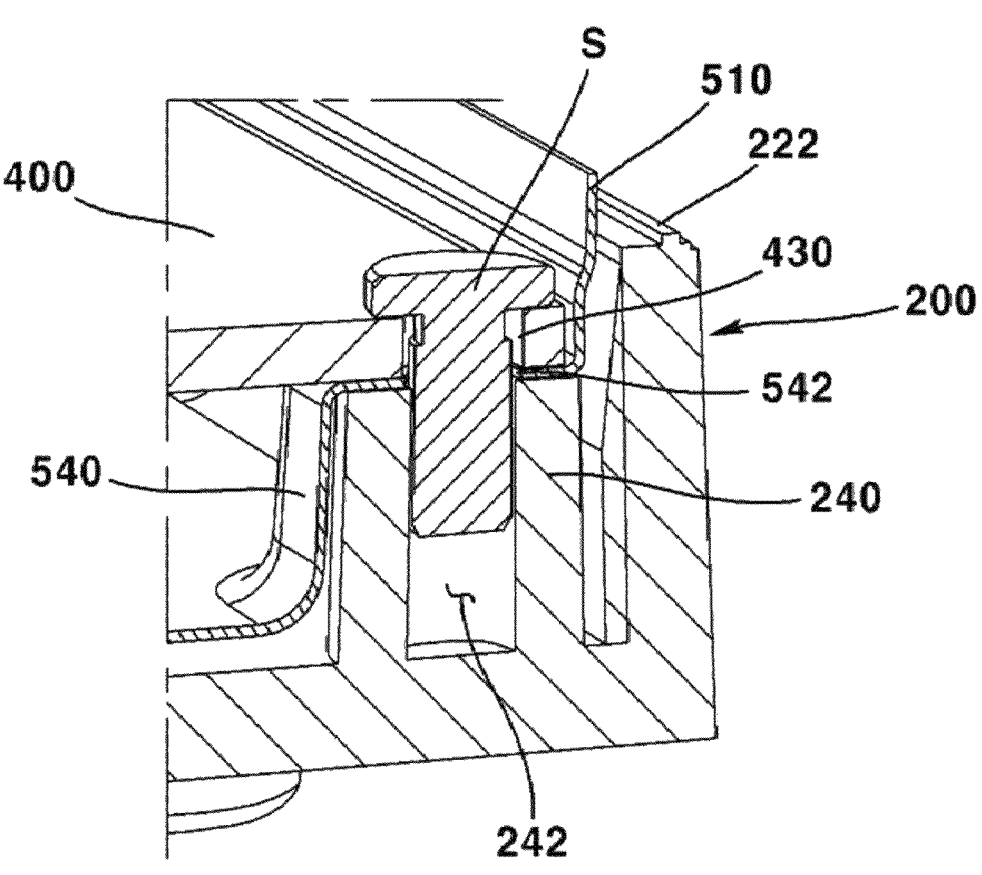
FIG. 10 is a drawing illustrating a combined structure of a printed circuit board, a shield member, and a second body, according to an embodiment of the present invention.
Figure 11:
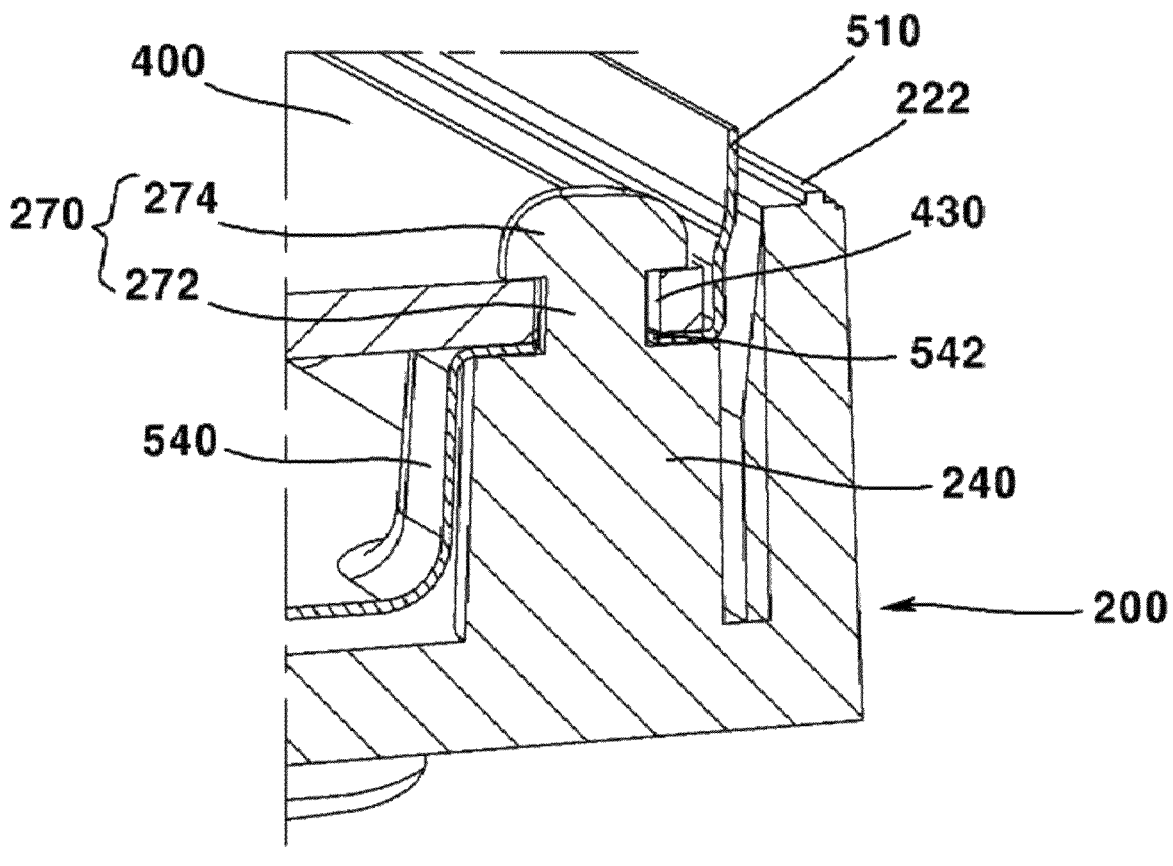
FIG. 11 is a drawing illustrating a modification of FIG. 10.

FIG. 1 is a perspective view illustrating the exterior of a camera module according to an exemplary embodiment of the present invention, FIG. 2 is a top view illustrating a side view of a camera module according to an exemplary embodiment of the present invention, FIG. 3 is a cross-sectional view of a camera module according to an exemplary embodiment of the present invention, FIG. 4 is an enlarged perspective view of A in FIG. 3, FIG. 5 is an exploded perspective view of a camera module according to an exemplary embodiment of the present invention, FIG. 6 is a drawing showing FIG. 5 from a different angle, FIG. 7 is a perspective view of an incised portion of a camera module according to an exemplary embodiment of the present invention, FIG. 8 is an exploded perspective view of a printed circuit board, shield member, and second body according to an exemplary embodiment of the present invention, FIG. 9 is an exploded perspective view of a first body and a second body, according to an exemplary embodiment of the present invention, FIG. 10 is a drawing illustrating a combined structure of a printed circuit board, a shield member, and a second body, according to an embodiment of the present invention, and FIG. 11 is a drawing illustrating a modification of FIG. 10.

Referring to FIGS. 1 to 11, the camera module (10) according to an exemplary embodiment of the present invention may be a vehicle camera module. The camera module (10) may be coupled to a vehicle. The camera module (10) may be used in one or more of a front camera, a side camera, a rear camera, and a black box of the vehicle. The camera module (10) may be disposed at the front of the vehicle. The camera module (10) may be disposed at the rear of the vehicle. The camera module (10) may be coupled to a windscreen of the vehicle. The camera module (10) may be coupled to the windscreen of the front or rear of the vehicle. The camera module (10) may be disposed on the side of a vehicle. The camera module (10) may photograph a subject and output an image to a display (not shown).

The camera module (10) may include a first body (100). The first body (100) may be named any one of a front body, an upper housing, a first housing, and a front cover. The first body (100) may include a body part (110). The first body (100) may include a barrel part (120). The first body (100) may include a lens (300). The body part (110), barrel part (120), and lens (300) of the first body (100) may be integrally formed. Any two or more of the body part (110), barrel part (120), and lens (300) of the first body (100) may be integrally formed. In a modification, the body part (110), the barrel part (120), and the lens (300) may each be formed separately.

The first body (100) and lens (300) may be referred to as the lens part.

Body part (110) may be coupled to barrel part (120). The body part (110) may be integrally formed with the barrel part (120). The body part (110) may be formed of a metal material. The body part (110) may be disposed over the second body (200), which will be described later. The body part (110) may be coupled to the second body (200). A lower end of the body part (110) may be secured to the second body (200). The body part (110) may be coupled to the second body (200) by an adhesive (800).

The body part (110) may be formed as a rectangular shape with an opening at the bottom. At this time, the corners of the body part (110) may be rounded. The body part (110) may include an upper plate (110a) and a first side plate (110b) extending from the upper plate (110a). The upper plate (110a) may be formed in a rectangular shape. The upper plate (110a) may extend outwardly from a lower outer peripheral surface of the barrel part (120). A first side plate (110b) may extend downwardly from an outer edge of the upper plate (110a). There may be a plurality of first side plates (110b). The first side plate (110b) may include four side plates. The first side plate (110b) may be formed in the shape of a square plate. The first side plate (110b) may include a first-1 side plate and a first-2 side plate, a first-3 side plate disposed opposite the first-2 side plate, and a first-4 side plate disposed opposite the first-2 side plate. The first side plate (110b) may include first-1 to first-4 corners each disposed between the first-1 to first-4 side plates. Each of the first-1 to first-4 corners may comprise a round shape in at least a portion.

On an inner side of the body part (110), a space part may be formed that is compartmentalized from other regions. The space part may be open at the bottom and covered at the top by the barrel part (120) and the lens (300).

On the bottom side of the body part (110), a first edge region for coupling with the second body (200) may be disposed. The first edge region may be disposed on an outer side of the space part. The first edge region may be formed on the lower surface of the first side plate (110b).

The first edge region may include a first protrusion (114) and a first groove (112). Here, the first protrusion (114) and the first groove (112) are relative to each other by protrusion shape, and the first protrusion (114) and the first groove (112) may be disposed in step with each other.

The first protrusion (114) may be disposed on an inner side of the first groove (112). The first protrusion (114) may be formed to project downwardly from a lower surface of the body part (110). The first protrusion (114) may be formed to project downwardly from a lower surface of the first side plate (110b). A lower end of the first protrusion (114) may be disposed lower than a bottom surface of the first groove (112).

The first groove (112) may be disposed on an outer side of the first protrusion (114). The first groove (112) may be formed to be recessed upwardly from the lower end of the first protrusion (114). A bottom surface of the first groove (112) may be disposed above the lower end of the first protrusion (114). The bottom surface of the first groove (112) may be defined as the lower surface of the first side plate (110b).

A first buffer part (117, see FIG. 4) may be disposed on a side of the first body (100). The first buffer part (117) may be formed to be recessed inwardly from the side of the body part (110), i.e., from the side of the first side plate (110b), than other regions. The first buffer part (117) may be disposed at a lower end of the first side plate (110b). The first buffer part (117) may be disposed on the outer side of the first groove (112). The first buffer part (117) may provide a larger area for placement of the adhesive (800, to be described later).

The first body (100) may include a barrel part (120). The barrel part (120) may be a lens barrel. The barrel part (120) may be formed of a metal material. The barrel part (120) may be disposed on the body part (110). The barrel part (120) may extend from an upper surface of the body part (110). The barrel part (120) may be integrally formed with the body part (110). In a modification, the barrel part (120) may be coupled to the body part (110). In this case, the barrel part (120) may be secured to the body part (110) by an adhesive. The barrel part (120) may accommodate a lens (300) therein. The barrel part (120) may include a hole. The lens (300) may be disposed in the hole in the barrel part (120). The inner circumferential surface of the hole in the barrel part (120) may be formed in a shape and size corresponding to the outer circumferential shape of the lens (300).

The first body (100) may include a lens (300). The lens (300) may be disposed on the barrel part (120). The lens (300) may be coupled to the barrel part (120). The lens (300) may be disposed in a hole in the barrel part (120). The lens (300) may include a plurality of lenses (300). The lens (300) may be aligned with an image sensor, as described later. The lens (300) may be optically aligned with the image sensor. The optical axis of the lens (300) may coincide with the optical axis of the image sensor. The first body 100 may include an infrared ray filter (IR filter) disposed between the lens (300) and the image sensor.

The camera module (10) may include a second body (200). The second body (200) may be referred to as a rear body, a lower housing, a second housing, or a rear cover. The second body (200) may be formed as a rectangular shape with an open top.

The second body (200) may be formed of a metal material. The second body (200) may be disposed below the first body (100). The second body (200) may be coupled to the first body (100). The second body (200) may be coupled with the first body (100) to form an interior space. The second body (200) may include an upper surface opening.

The second body (200) may include a bottom plate (210). The bottom plate (210) may be opposite the upper plate (110a) of the body part (110) of the first body (100). The bottom plate (210) may be spaced apart from the upper plate (110a) of the body part (110) of the first body (100) in an optical axis direction. The bottom plate (210) may be parallel to the upper plate (110a) of the body part (110) of the first body (100). The bottom plate (210) may be formed in a square shape. In this case, the corners of the bottom plate (210) may include a rounded shape at least in part.

The second body (200) may include a second side plate (220). The second side plate (220) may extend from the bottom plate (210). The second side plate (220) may extend from an outer edge of the bottom plate (210). A shield member (500) may be disposed on the second side plate (220). An inner surface of the second side plate (220) may be contacted by the shield member (500). An upper end of the second side plate (220) may be coupled to the first body (100). An outer surface of the second side plate (220) may be co-planar with an outer surface of the first side plate (110*b*) of the first body (100).

The second body (200) may include a connector ejection part (290). The connector ejection part (290) may be coupled to the bottom plate (210). The connector ejection part (290) may be disposed in a hole (291) in the bottom plate (210, see FIG. 8). The connector ejection part (290) may penetrate the hole (291) in the bottom plate (210). The connector ejection part (290) may have a connector (600) disposed therein. The connector ejection part (290) may be formed of a metal material.

The connector ejection part (290) may have a pipe-like shape that is hollow on the inside. The inner surface of the connector ejection part (290) may include a protrusion (292) that projects inwardly over other areas. The protrusion (292) may have an inner surface that contacts an outer surface of the connector (600). Accordingly, the connector (600) may be held securely within the connector ejection part (290). Additionally, when the connector (600) is coupled to the second body (200), the protrusion (292) of the connector ejection part (290) may have an alignment effect.

At an upper end of the protrusion (292), a slope 294 (see FIG. 12) may be disposed that is shaped to increase in distance from the connector (600) as it moves downwardly. The sloping (294) may facilitate guiding the connector (600) into the space within the connector ejection part (290).

A sealing member (700) may be disposed between the connector (600) and the connector ejection part (290). The sealing member (700) may inhibit external debris from entering the space within the second body (200). The sealing member (700) may be disposed on an upper side of the protrusion (292).

The second body (200) may include a second edge region. The second edge region may be disposed on an outer side of the space of the second body (200). The second edge region may be formed on an upper surface of the second side plate (220). The second edge region may form an upper edge of the second body (200). The second edge region may be disposed optically opposite the first edge region.

When the first body (100) and the second body (200) are coupled, the first edge region and the second edge region may be at least partially spaced apart in the optical axis direction. When the first body (100) and the second body (200) are coupled, an adhesive (800) may be disposed between the first edge region and the second edge region.

The second edge region may include a second protrusion (222) and a second groove (224). The second groove (224) may be disposed on an inner side of the second protrusion (222). With respect to the optical axis direction, the first protrusion (114) and the second groove (224) may be disposed opposite each other, and the first groove (112) may be disposed opposite the second protrusion (222). The second protrusion (222) and the second groove (224) may be disposed relative to each other by virtue of their protrusion geometry, and the second protrusion (222) and the second groove (224) may be disposed in step with each other.

The second protrusion (222) may be formed to project upwardly from an upper surface of the second body (200). The second protrusion (222) may be formed to project upwardly from an upper surface of the second side plate (220). The second protrusion (222) may be disposed at least partially on the inner side of the first groove (112), but alternatively, the upper surface of the second protrusion (222) may be disposed on a lower side of the first protrusion (114), or may be disposed to form a co-planar surface. The upper surface of the second protrusion (222) may be spaced apart from the bottom surface of the first groove (112) in an optical axis direction. An upper end of the second protrusion (222) may be disposed above the bottom surface of the second groove (224). At an outside of the second protrusion (222) may be further disposed an upper surface region of the second side plate (220) forming a plane coplanar with the bottom surface of the second groove (224).

The second groove (224) may be disposed on an inner side of the second protrusion (222). A bottom surface of the second groove (224) may be disposed lower than an upper surface of the second protrusion (222). The second groove (224) may engage the first protrusion (114). A bottom surface of the second groove (224) may be spaced apart in an optical axis direction from a bottom surface of the first protrusion (114). The bottom surface of the second groove (224) may be defined by an upper surface of the second side plate (220).

A second buffer part (227, see FIG. 4) may be disposed on a side of the second body (200). The second buffer part (227) may be formed to be recessed inwardly from the side of the second side plate (220) more than other regions. The second buffer part (227) may be arranged to face the first buffer portion (117) in an optical axis direction. The second buffer part (227) may be disposed on top of the second side plate (220). The second buffer part (227) may be disposed on the outer side of the second protrusion (222). The second buffer part (227) may provide a larger placement area for an adhesive (800, to be described later).

A plurality of ribs and rib grooves may be disposed alternately on the inner surface of the second body (200). The ribs and rib grooves may be disposed on the inner surface of the second side plate (220). The ribs may protrude inwardly from the inner surface of the second side plate (220) more than other areas. The rib grooves may be disposed between a plurality of adjacent ribs and may have a grooved shape. The ribs and rib grooves may form an uneven pattern (1 11) on the inner surface of the second body (200). The ribs and grooves may increase the cross-sectional area of the second side plate (220), which may improve heat dissipation efficiency upon contact with the shield member (500), which will be described later.

The second body (200) may include a second coupling part (240). The second coupling part (240) may be formed to project upwardly from an upper surface of the bottom plate (210). An upper surface of the second coupling part (240) may be disposed lower than an upper surface of the second side plate (220). The second coupling part (240) may be provided in a plurality and spaced apart from each other. The second coupling part (240) may be disposed in a corner region of the space within the second body (200). In one example, there may be two second coupling parts (240), each disposed at a first corner region in the space portion and a second corner region opposite the first corner region. A first hole (242) may be formed on the upper surface of the second coupling part (240). The first hole (242) may be threaded with a screw(S) to be described later. The second coupling part (240) may be circular or rectangular in cross-section.

A first rib (244) may be formed on the upper surface of the second coupling part (240) that projects upwardly above the other regions. The first rib (244) may have a circular cross-section. The first rib (244) may pass through a fifth hole (541) of the shield member (500), which will be described later, and engage a third hole (431) of a printed circuit board (400). A cross-sectional area of the first hole (242) may be formed larger than a cross-sectional area of the first rib (244).

The camera module (10) may include an adhesive (800). The adhesive (800) may be a region where the adhesive has cured. More specifically, the adhesive (800) may be a region in which an epoxy has cured. The adhesive (800) may securely hold the first body (100) and the second body (200) in a coupled state.

The adhesive (800) may be disposed between the first body (100) and the second body (200). The adhesive (800) may be disposed between the first edge region and the second edge region. As described above, a space at least partially spaced apart in the optical axis direction may be disposed between the first edge region and the second edge region, and the adhesive (800) may be disposed in the space.

Thus, the adhesive (800) may be disposed between a lower surface of the first protrusion (114) and the bottom surface of the second groove (224), and between the upper surface of the second protrusion (222) and the bottom surface of the first groove (112), to firmly couple the first body (100) and the second body (200).

On the other hand, when an adhesive such as epoxy is injected into the area between the first body (100) and the second body (200), a wide injection area is formed by the first buffer part (117) and the second buffer part (227), which has the advantage that an injection process can be easily formed. Alternatively, the first body (100) and the second body (200) may be coupled with epoxy injected into the first groove (112) or the second groove (224). In this case, the adhesive (800) may form a relatively wide adhesive area on the outer surface of the first body (100) and the second body (200) by the first buffer part (117) and the second buffer part (227).

The camera module (10) may include a printed circuit board (400). The printed circuit board (400) may be referred to as a substrate. The printed circuit board (400) may be disposed within the second body (200). The printed circuit board (400) may be disposed in a space within the second body (200).

The second body (200) and the printed circuit board (400) may be referred to as the image sensor part.

An image sensor (410) may be disposed on an upper surface of the printed circuit board (400). A connector (600) may be coupled to a lower surface of the printed circuit board (400). The printed circuit board (400) may be electrically connected to the connector (600). The image sensor (410) may be electrically connected to the connector (600) through the printed circuit board (400). The connector (600) may be soldered to the lower surface of the printed circuit board (400).

The printed circuit board (400) may include a second hole (430) and a third hole (431). The second hole (430) and the third hole (431) may each be formed to extend downwardly from an upper surface of the printed circuit board (400). The second hole (430) may be arranged to face the first hole (242) of the second body (200) in an optical axis direction. The third hole (431) may be arranged to face the first rib (244) of the second body (200) in an axial direction. The second hole (430) and the third hole (431) may each have a plurality of holes, and may be disposed in respective opposing corner regions of the printed circuit board (400). The second hole (430) and the third hole (431) may have different cross-sectional areas. In one example, the cross-sectional area of the second hole (430) may be formed larger than the cross-sectional area of the third hole (431). The cross-sectional area of the third hole (431) may correspond to the cross-sectional area of the first rib (244). The region of the printed circuit board (400) in which the second hole (430) and the third hole (431) are formed may be a ground region for a ground power source.

The camera module (10) may include a shield member (500). The shield member (500) may be disposed in a space within the second body (200). The shield member (500) may be formed of a metal material and may shield external electromagnetic waves. The shield member (500) may include a bottom plate (520) and a side plate (510) that bends upwardly into an edge region of the bottom plate (520). In this case, the bottom plate (210) of the second body (200) may be named the first bottom plate, the bottom plate (520) of the shield member (500) may be named the second bottom plate, and the side plate (510) of the shield member (500) may be named the third side plate.

The second bottom plate (520) may be in contact with the first bottom plate (210). The third side plate (510) may be in contact with the second side plate (220). The third side plate (510) may have at least a portion of a bent region such that the cross-sectional area of the interior space is different.

The printed circuit board (400) may be disposed in a space within the shield member (500). In this case, an upper surface of the third side plate (510) may be disposed above an upper surface of the printed circuit board (400). A portion of the upper surface of the third side plate (510) may be disposed in a space within the first body (100).

The shield member (500) may include a first coupling part (540). The first coupling part (540) may be formed to project upwardly from an upper surface of the second bottom plate (520). Alternatively, the first coupling part (540) may be shaped by an inward bend in the corner region where the second bottom plate (520) and the third side plate (510) meet. The upper surface of the first coupling part (540) may be disposed lower than the upper surface of the third side plate (510). The first coupling part (540) may be disposed to face the second coupling part (240) in an optical axis direction. The first coupling part (540) may be disposed in a corner region of the space within the shield member (500). There may be a plurality of first coupling parts (540), disposed at each opposing corner region of the space within the shield member (500).

The lower surface of the shield member (500) corresponding to the formed region of the first coupling part (540) may be formed with a coupling groove (530) that is more upwardly recessed than the other regions. The cross-sectional shape of the coupling groove (530) may be formed to correspond to the cross-sectional shape of the second coupling part (240) of the second body (200). The coupling groove (530) may engage the second coupling part (240). The second coupling part (240) may be disposed within the coupling groove (530).

The first coupling part (540) may include a fourth hole (542) and a fifth hole (541). The fourth hole (542) and fifth hole (541) may be formed to extend downwardly from the upper surface of the first coupling part (540). The fourth hole (542) may be disposed to be optically opposed to the first hole (242) of the second body (200) and the second hole (430) of the printed circuit board (400). The cross-sectional shapes of first hole (542), second hole (430), and fourth hole (542) may be formed to correspond to each other. The fifth hole (541) may be disposed to face the first rib (244) of the second body (200) and the third hole (431) of the printed circuit board (400) in an optical axis direction. The fourth hole (542) and the fifth hole (541) may have different cross-sectional areas. In one example, the cross-sectional area of the fourth hole (542) may be formed larger than the cross-sectional area of the fifth hole (541).

The shield member (500) may include a connector hole (522). The connector hole (522) may be formed to extend downwardly from an upper surface of the second bottom plate (520). The connector hole (522) may be disposed at approximately the center of the second bottom plate (520). The connector hole (522) may be formed to correspond to a placement area of the connector (600). The cross-sectional area of the connector hole (522) may be formed to be larger than the cross-sectional area of the connector (600). The connector hole (522) may be penetrated by the connector (600). The connector (600) may extend from a lower surface of the printed circuit board (400), penetrate the connector hole (522), and be coupled to an inner side of the connector ejection part (290). The shield member (500) may include a guide (580). The guide 580 may be disposed in the connector hole 522 formation region. The guide (580) may be shaped to protrude from an inner surface of the connector hole (522). The guide (580) may be formed by incising a portion of the second bottom plate (520). The guide (580) may be formed in a plural number and spaced apart from each other along a circumferential direction relative to the connector (600).

The guide (580) may have at least one bent region. The guide (580) may extend from a bottom surface of the second bottom plate (520). The guide (580) may include a first region (582) projecting from an inner surface of the connector hole (522), and a second region (584) that is bent and projects inwardly from an end of the first region (582). An inner surface of the second region (584) may be formed with a protruding region that projects inwardly from the other regions. The protruding region may contact an outer surface of the connector (600). The protruding region may press against the outer surface of the connector (600). The guide (580) may be resilient in the direction that the protruding region presses against the outer surface of the connector (600), thereby allowing the connector (600) to be held firmly within the connector hole (522). Additionally, when the connector (600) is coupled with the shield member (500), the guide (580) may cause the two to be coupled in an aligned position.

Referring to FIG. 10, the printed circuit board (400) may be coupled to the shield member (500) and the second body (200) via a fastening member. The fastening member may include a screw(S). Through the fastening member, the printed circuit board (400) may be screwedly coupled to the shield member (500) and the second body (200). In this case, the screws(S) may be coupled from top to bottom of the printed circuit board (400). The screw(S) may be threaded through the second hole (430) of the printed circuit board (400), through the fourth hole (542) of the shield member (500), and into the first hole (242) of the second body (200). An inner surface of the first hole (242) may be formed with a thread or threaded groove. On the other hand, prior to screwing together the printed circuit board (400), the shield member (500), and the second body (200), the first rib (244) may penetrate the fifth hole (541) of the shield member (500) and be coupled to the third hole (431) of the printed circuit board (400), thereby allowing the screwing process to proceed more easily, as the coupling of the printed circuit board (400), the shield member (500), and the second body (200) may be initially achieved.

FIG. 11 is a modification of FIG. 10, wherein the printed circuit board (400), the shield member (500), and the second body (200) may be coupled to each other via a protrusion (270) of the second body (200), rather than via a screw connection. In this case, the fastening member may be the protrusion (270). The protrusion (270) may be integrally formed with the second body (200). The protrusion (270) may project upwardly from the upper surface of the second coupling part (240) and may be disposed to penetrate the fourth hole (542) of the shield member (500) and the second hole (430) of the printed circuit board (400). The protrusion (270) may include a first region (272) disposed within the fourth hole (542) and the second hole (430), and a second region (274) disposed on the upper surface of the first region (272) and disposed on the printed circuit board (400). The second region (274) may be formed to be larger than the cross-sectional area of the first region (272), the fourth hole (542), and the second hole (430). The second region (274) may be formed by applying heat to a portion of the upper end of the protrusion (270). Accordingly, the printed circuit board (400), the shield member (500), and the second body (200) may be fused to each other.

According to the above structure, the printed circuit board (400) may be firmly fixed in the space within the shield member (500) and the second body (200), which has the advantage of inhibiting the printed circuit board (400) from being damaged by an external impact, and facilitating alignment of the distance between the image sensor (410) and the lens (300) disposed on the printed circuit board (400).

Figure 12:
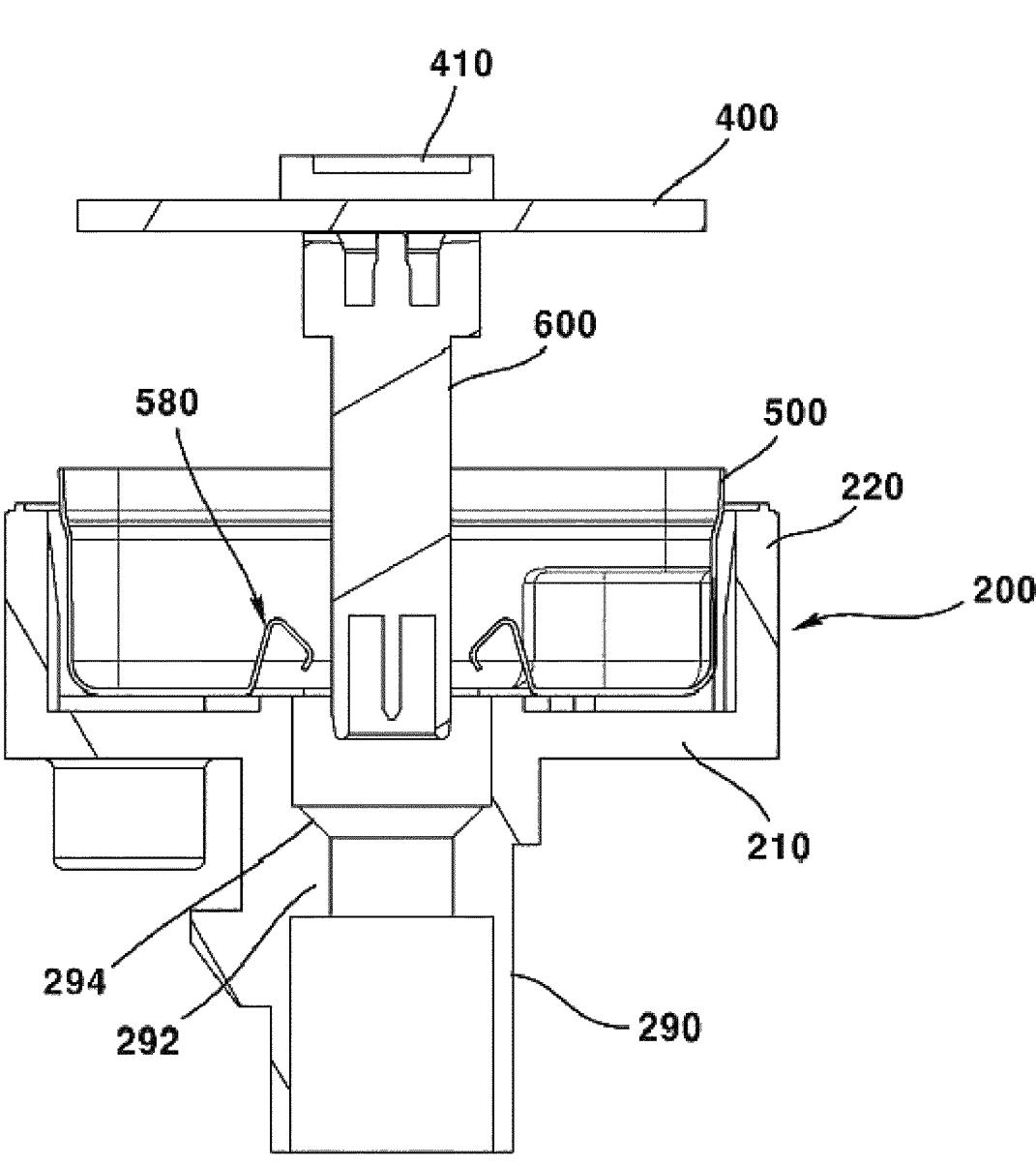
FIGS. 12 and 13 are drawings illustrating the coupling of the printed circuit board and the second body, according to an exemplary embodiment of the present invention.
Figure 13:
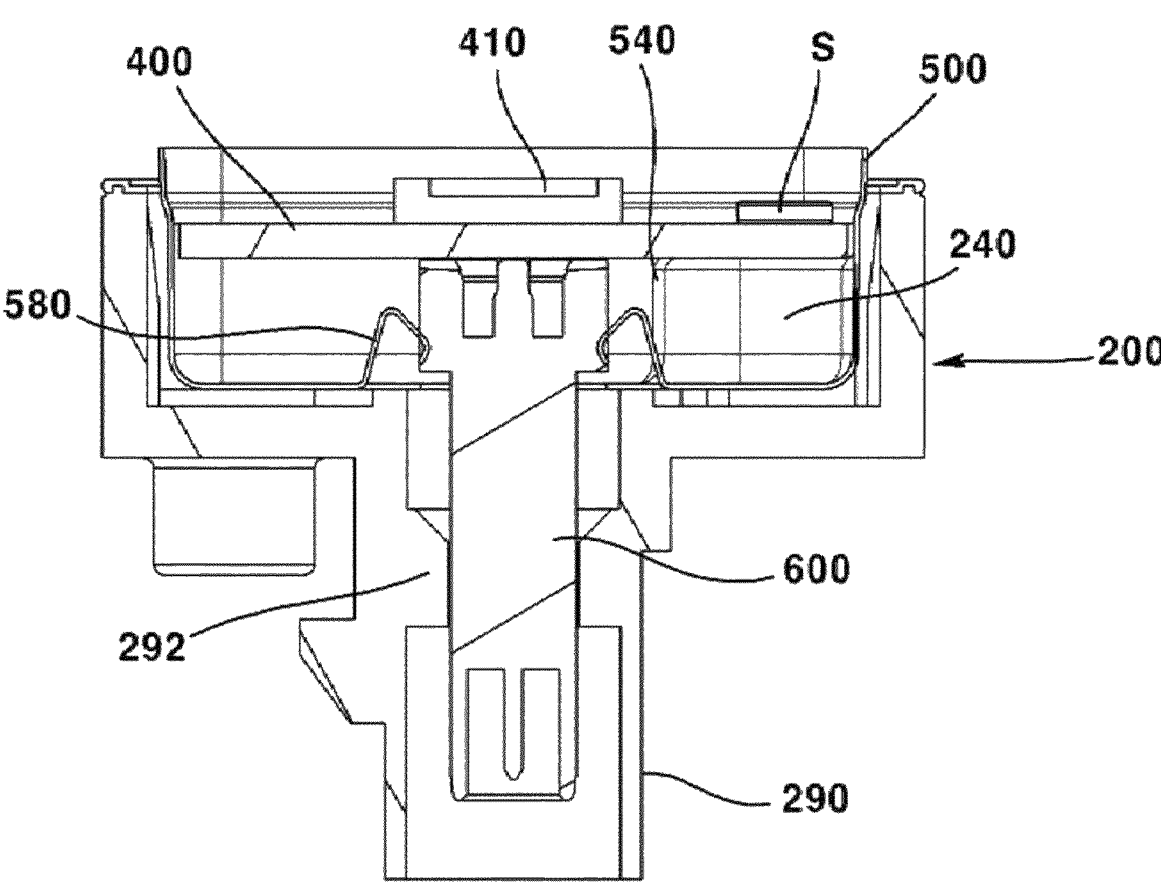

FIGS. 12 and 13 are drawings to illustrate the coupling of the printed circuit board and the second body, according to an exemplary embodiment of the present invention. Specifically, when the printed circuit board (400) and the second body (200) are coupled, the connector (600) and the printed circuit board (400) are coupled to the second body (200) in a state of being coupled to the lower surface of the printed circuit board (400), which has the advantage that the coupling process of the printed circuit board (400) in the second body (200) and the coupling process of the connector (600) may be unified. In particular, during assembly, the printed circuit board (400) is guided in its downward movement by the second coupling part (240) and the first coupling part (540) so that the connector (600) can be precisely aligned in the designed position in the space within the connector ejection part (290). This is differentiated from prior art structures where the printed circuit board and connector are assembled separately.

Furthermore, since the printed circuit board (400) is guided by the second coupling part (240) and the first coupling part (540), the camera module (10) according to an exemplary embodiment of the present invention has the advantage of being able to easily align the optical axis distance between the image sensor (410) and the lens (300).

In other words, the combination (coupling) of the first body (100) and the second body (200) has the advantage that the optical axis of the lens (300) and the position of the image sensor (410) can be aligned simultaneously.

Figure 14:
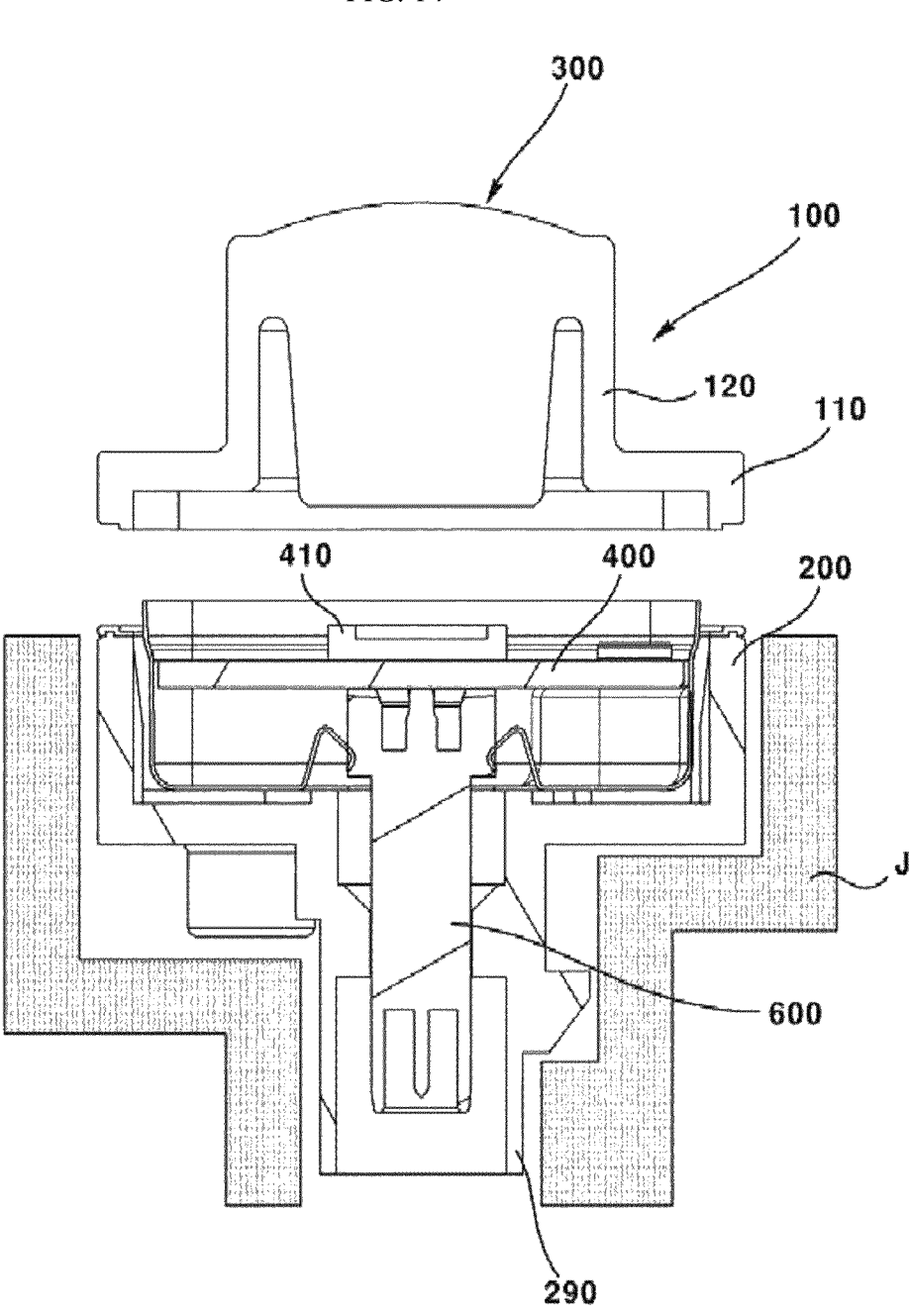
FIG. 14 is a drawing illustrating the coupling of the first body with the second body in a fixed position, according to an exemplary embodiment of the present invention.
Figure 15:
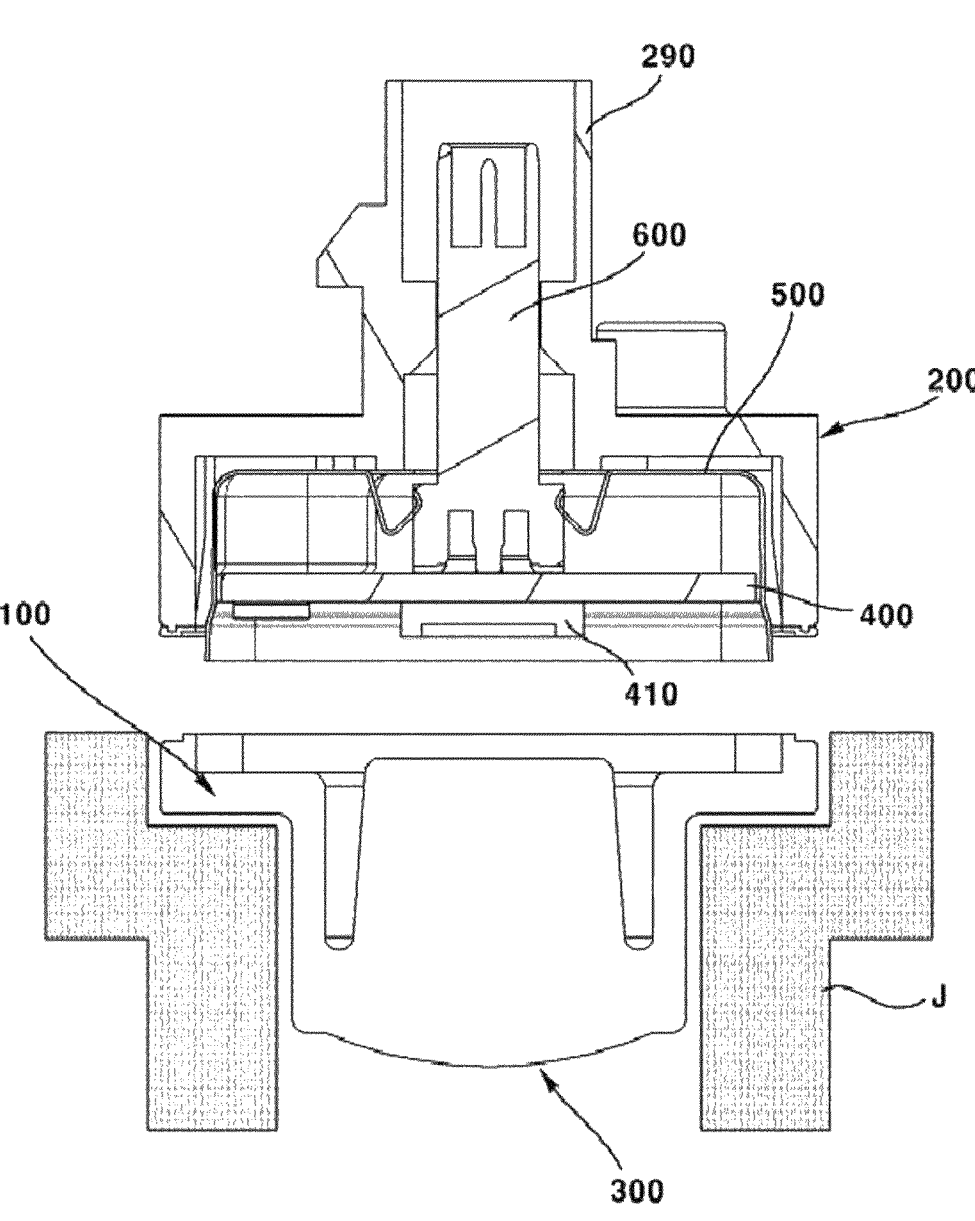
FIG. 15 is a drawing illustrating the coupling of the first body with the second body in a fixed state, according to an exemplary embodiment of the present invention.

FIG. 14 is a diagram illustrating a state in which the first body is coupled with the second body according to an exemplary embodiment of the present invention, and FIG. 15 is a diagram illustrating a state in which the first body is coupled with the second body according to an exemplary embodiment of the present invention.

As shown in FIGS. 14 and 15, the position alignment of the optical axis of the lens (300) with the image sensor (400) may be implemented during the curing of the adhesive (800) after the coupling of the first body (100) and the second body (200). Furthermore, the position alignment of the optical axis of the lens (300) and the image sensor (410) may be achieved in a process in which one of the first body (100) and the second body (200) is fixed by a jig (J) and the other is adjusted.

Specifically, the camera module (10) has the advantage in that the printed circuit board (400) is fixed in position within the second body (200), so that when the first body (100) is coupled to the second body (200) while the second body (200) is fixed to the jig (J), as shown in FIG. 14, the process of coupling the first body (100) and the second body (200) via the adhesive (800) and the process of adjusting the distance between the image sensor (410) and the lens (300) can be unified. In this case, the optical axis between the lens (300) and the image sensor (410) can be aligned and the distance between the lens (300) and the image sensor (410) can be adjusted by adjusting the thickness of the adhesive (800) formed during the curing process of the adhesive (800) disposed between the first body (100) and the second body (200).

Furthermore, the camera module (10) according to an exemplary embodiment of the present invention has the advantage in that since the printed circuit board (400) is fixed in position in the second body (200), the process of coupling the first body (100) and the second body (200) via the adhesive (800) and the process of adjusting the distance between the image sensor (410) and the lens (300) can be unified even when the first body (100) is fixed on the jig (J), as shown in FIG. 15. In this case, by adjusting the thickness of the adhesive (800) formed during the curing process of the adhesive (800) disposed between the first body (100) and the second body (200), the optical axis between the lens (300) and the image sensor (410) can be aligned, and the distance between the lens (300) and the image sensor (410) can be adjusted.

Although embodiments of the present invention have been described with reference to the accompanying drawings, one having ordinary skill in the technical field to which the present invention belongs will understand that the invention may be practiced in other specific forms without altering its technical ideas or essential features. It should therefore be understood that the embodiments described above are exemplary in all respects and not limiting.

The invention claimed is:

1. A camera module comprising:
a first body including a lens;
a second body coupled to the first body;
a shield member coupled to the second body;
a substrate disposed within the shield member; and
a fastening member coupling the substrate and the shield member to the second body,
wherein the shield member includes a bottom plate and a side plate extending upward from an edge of the bottom plate and a first coupling part protruding from the bottom plate to support the substrate,
wherein an upper surface of the first coupling part is positioned below an upper surface of the side plate,
wherein the upper surface of the side plate is positioned above an upper surface of the substrate,
wherein a coupling groove having a concave shape is positioned in an area corresponding to a formation area of the first coupling part on a lower surface of the shield member, and
wherein the second body includes a second coupling part that is coupled to the coupling groove.

2. The camera module of claim 1, wherein the first body is coupled to the second body by an adhesive.

3. The camera module of claim 1, wherein the first coupling part of the shield member includes a fourth hole into which the fastening member is inserted.

4. The camera module of claim 3, wherein the substrate includes a second hole formed in a position corresponding to the fourth hole of the shield member, and the fastening member is inserted into the second hole.

5. The camera module of claim 4, wherein the fastening member includes a screw, and the second body includes a first hole into which the screw is threaded.

6. The camera module of claim 1, wherein the fastening member is integrally formed with the second body.

7. The camera module of claim 1, wherein the fastening member is formed extending from one end of the second coupling part of the second body.

8. The camera module of claim 1, wherein the first body is spaced apart from the substrate.

9. The camera module of claim 1, comprising a connector connected to the substrate,
wherein the shield member includes a guide extending from a bottom surface to support the connector.

10. The camera module of claim 9, wherein the guide includes a first region extending from the bottom surface and a second region bent at one end of the first region.

11. The camera module of claim 10, wherein a protruding area that protrudes inward and presses an outer surface of the connector is disposed on an inner surface of the second region.

12. The camera module of claim 1, wherein the first body includes a first side plate with a first groove formed at an end, and
wherein the second body includes a second side plate at an end having a second protrusion facing the first groove.

13. The camera module of claim 12, wherein an adhesive is disposed between the first groove and the second protrusion.

14. The camera module of claim 1 comprising an image sensor disposed on the substrate,
wherein when the first body and the second body are combined, an optical axis of the lens and the image sensor are aligned.

15. A camera module comprising:
a lens part including a lens and a first body;
an image sensor part coupled to the lens part, the image sensor part including a substrate on which an image sensor is disposed and a second body to which the substrate is coupled; and
a connector electrically connected to the image sensor part,
wherein the image sensor part includes a shield member including a bottom plate and a side plate extending upward from an edge of the bottom plate and a first coupling part protruding from the bottom plate to support the substrate,
wherein an upper surface of the first coupling part is positioned below an upper surface of the side plate,
wherein the upper surface of the side plate is positioned above an upper surface of the substrate,
wherein a coupling groove having a concave shape is positioned in an area corresponding to a formation area of the first coupling part on a lower surface of the shield member, and
wherein the second body includes a second coupling part that is coupled to the coupling groove.

16. The camera module of claim 15, wherein the first body is coupled to the second body by an adhesive.

17. The camera module of claim 16, wherein the first body includes a first side plate with a first groove formed at an end, and wherein the second body includes a second side plate at an end having a second protrusion facing the first groove.

18. The camera module of claim 17, wherein the adhesive is disposed between the first groove of the first body and the second protrusion of the second body.

19. The camera module of claim 15, wherein the shield member includes a guide extending from a bottom surface to support the connector, and wherein the guide includes a first region extending from the bottom surface and a second region bending at one end of the first region.

\* \* \* \* \*